(12) United States Patent
Kim

(10) Patent No.: US 7,834,831 B2
(45) Date of Patent: Nov. 16, 2010

(54) LIQUID CRYSTAL DISPLAY DEVICE AND METHOD FOR DRIVING THE SAME

(75) Inventor: Young Ok Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 1238 days.

(21) Appl. No.: 11/411,904

(22) Filed: Apr. 27, 2006

(65) Prior Publication Data

US 2006/0244711 A1 Nov. 2, 2006

(30) Foreign Application Priority Data

Apr. 28, 2005 (KR) ........................ 10-2005-0035629

(51) Int. Cl.
*G09G 3/36* (2006.01)
*G02F 1/1345* (2006.01)

(52) U.S. Cl. ........................ 345/87; 349/149

(58) Field of Classification Search ................... 345/87; 349/149

See application file for complete search history.

(56) References Cited

U.S. PATENT DOCUMENTS 6,753,836 B2 * 6/2004 Kwon .......................... 345/87

7,408,535 B2 * 8/2008 Fujita .......................... 345/100
2005/0083474 A1 * 4/2005 Park .......................... 349/151

FOREIGN PATENT DOCUMENTS

GB 2 415 821 A 1/2006
JP 4-147112 A 5/1992

* cited by examiner

*Primary Examiner*—Amr Awad
*Assistant Examiner*—Randal Willis
(74) *Attorney, Agent, or Firm*—Birch, Stewart, Kolasch & Birch LLP

(57) ABSTRACT

A COG type LCD device and method are disclosed, which improve picture quality by minimizing driving voltage drop. The device according to an embodiment comprises an image area including a thin film transistor and a pixel electrode in a pixel region defined by gate and data lines crossing each other. A plurality of drive IC chips are formed using a COG (Chip On Glass) method in the periphery of the image display area. A LOG (Line On Glass) line is provided for cascading the plurality of drive IC chips to divide various signals inputted from an external driving circuit and to provide the divided signals to the respective drive IC chips. The LOG line includes analog and digital power lines. First and second switches are provided between the analog and digital power lines so as to temporarily short the analog and digital power lines.

18 Claims, 3 Drawing Sheets

LIQUID CRYSTAL DISPLAY DEVICE AND METHOD FOR DRIVING THE SAME

This application claims the benefit of the Korean Patent Application No. 10-2005-35629, filed on Apr. 28, 2005, which is hereby incorporated by reference as if fully set forth herein.

BACKGROUND OF THE INVENTION

1. Field of the Invention

The present invention relates to a liquid crystal display (LCD) device, and more particularly, to a chip on glass (COG) liquid crystal display (LCD) device.

2. Discussion of the Related Art

Among the various flat display devices, liquid crystal display (LCD) devices have been widely used due to their advantageous characteristics such as high contrast ratio, good gray scale, good moving picture quality, and low power consumption.

Generally, the LCD device includes a color filter CF array substrate having a color filter layer to represent colors, a thin film transistor TFT array substrate being disposed opposite to the CF array substrate, a liquid crystal layer formed between the TFT array substrate and the CF array substrate, and a driving unit for driving the TFT array substrate.

The TFT array substrate includes a plurality of gate and data lines crossing each other to define pixel regions, a plurality of thin film transistors TFT formed adjacent to the crossings of the gate and data lines, and storage capacitors for maintaining a charged state of the pixel region until the region is addressed next time.

The driving unit includes a gate driver for driving the gate lines, a data driver for driving the data lines, a timing controller for controlling the gate and data drivers, and a power supply for providing driving voltages used for driving the LCD device. The timing controller controls driving timings of the gate and data drivers, and provides a video signal to the data driver. Also, the power supply generates the driving voltages including a common voltage Vcom, a gate high voltage Vgh and a gate low voltage Vgl from an input power, to thereby drive the LCD device.

The gate driver sequentially provides a scanning signal to the gate lines to drive the pixel regions a line at a time. Also, the data driver provides a video signal to the respective data lines whenever the scanning signal is provided to any one of the gate lines. Accordingly, the LCD device can control the light transmittance by an electric field generated between a pixel electrode and a common electrode, to thereby display images.

Each of the gate and data drivers is provided with a plurality of drive integrated circuit (IC) chips. A process for providing the drive IC chips to the gate and data drivers is classified into a tape automated bonding (TAB) method and a chip on glass (COG) method. In the TAB method, the gate and data drive IC chips are mounted on a tape carrier package (TCP), and then are brought in contact with an LCD panel. In the COG method, the drive IC chips are directly mounted on the TFT array substrate. Recently, so as to obtain a thin profile of the LCD device by minimizing the size of PCB, a trend has been to use a line on glass (LOG) method in which signal lines being in contact with the drive IC chips are formed on a glass substrate.

Hereinafter, a TFT array substrate of an LCD device according to a related art will be described with reference to the accompanying drawings.

FIG. 1 is a plan view illustrating a COG type LCD device according to a related art. FIG. 2 is a schematic view illustrating an arrangement of the data drive IC chips according to the related art.

As shown in FIG. 1, a TFT array substrate 150 is divided into an image display area 152 and a non-image display area 154.

On the image display area 152 of the TFT array substrate 150, a plurality of data lines 162, a plurality of gate lines 161, a plurality of thin film transistors TFT, and a plurality of pixel electrodes 110 are formed. Each data line 162 transmits a video signal. The gate lines 161 are formed perpendicular to the data line 162 to define a plurality of unit pixel regions. The gate lines 161 transmit a scanning signal to each pixel region. The thin film transistors TFT are formed adjacent to the crossings of the gate and data lines 161 and 162. The thin film transistors TFT each includes a gate electrode, a gate insulating layer, a semiconductor layer, and source and drain electrodes. Each pixel electrode is connected with the drain electrode of a corresponding thin film transistor TFT by interposing a passivation layer therebetween. 013 On the non-image display area 154 of the TFT array substrate 150, respective ends of the gate and data lines 161 and 162 are connected with a plurality of gate and data drive IC chips 170 and 180 adhered to the TFT array substrate 150.

The gate drive IC chips 170 are connected to one another by an LOG line 182 formed on the TFT array substrate. Also, the data drive IC chips 180 are connected to one another by another LOG line 182. The LOG lines 182 are connected to a printed circuit board (PCB) for providing various signals via a cable 190. That is, the various signals from the PCB are transmitted to the gate and data drive IC chips 170 and 180 by the LOG line 182.

To minimize the line connections, the data and gate drive IC chips 170 and 180 are cascaded on the TFT array substrate 150 by the LOG lines 182. Then, a power signal, a video interface signal and a sampling start pulse (SSP) signal are inputted to the drive IC chips. However, when the drive IC chips are cascaded, a problem occurs in that the driving voltage outputted from the data drive IC chips may drop.

That is, as shown in FIG. 2, even though the PCB provides a constant driving voltage Vin to the data drive IC chips through the cable 190, the driving voltage drops going from the PCB due to the resistance of the PCB and the LOG line 182. For example, if the driving voltage Vin is 5.0V, a voltage V1 inputted to the first data drive IC chip (D-IC(1)) may drop to 4.96V, a voltage V2 inputted to the second data drive IC chip (D-IC(2)) may drop to 4.50V, and a voltage V3 inputted to the third data drive IC chip (D-IC(3)) may drop to 4.00V.

The voltage inputted to the respective data drive IC chips changes due to the resistance of the LOG line 182. Accordingly, in a black image (in case of a normally white mode) having a high current, the data drive IC chips output different driving voltages, whereby the pixel voltages applied to the respective data lines are also changed. As a result, it is difficult to align liquid crystal molecules to a desired direction, thereby deteriorating the brightness of the image.

SUMMARY OF THE INVENTION

Accordingly, the present invention is directed to a COG type LCD device, which substantially obviates one or more problems due to limitations and disadvantages of the related art.

An aspect of the present invention is to provide a LCD device and method for driving the same to improve an image quality by minimizing a drop of the driving voltage.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to an aspect of the present invention, a COG (Chip On Glass) type LCD (Liquid Crystal Display) device comprises an image display area including a thin film transistor and a pixel electrode in a pixel region defined by gate and data lines crossing each other; a plurality of drive IC chips formed using a COG (Chip On Glass) method in a periphery of the image display area; a LOG (Line On Glass) line for cascading the plurality of drive IC chips to divide a plurality of signals inputted from an external driving circuit and configured to provide the divided signals to the respective drive IC chips, wherein the LOG line includes an analog power line and a digital power line; and first and second switches provided between the analog and digital power lines and configured to temporarily short the analog and digital power lines.

The digital power line and the analog power line can be temporarily shorted when the current flow, for example in the analog power line, is increasing. That is, the analog power line and the digital power line can be connected to form a parallel resistance structure, to thereby minimize the drop of the analog driving voltage. The plurality of drive IC chips may be a plurality of data drive IC chips or a plurality of gate drive IC chips.

According to another aspect of the present invention, there is provided an apparatus to provide a plurality of driving voltage signals to a plurality of gate lines or a plurality of data lines of a LCD device. The apparatus includes a plurality of drive integrated circuit chips configured to provide driving signals to the plurality of the gate lines or the plurality of the data lines; a LOG line configured to cascade the plurality of drive IC chips and configured to transmit a plurality of signals provided from an external driving circuit to the plurality of the drive IC chips, wherein the LOG line includes an analog power line and a digital power line; a LOG (Line On Glass) line configured to cascade the plurality of drive IC chips and configured to transmit a plurality of signals provided from an external driving circuit to the plurality of the drive IC chips, wherein the LOG line includes an analog power line and a digital power line; and at least one switch configured to temporarily short the analog and digital power lines.

According to a further aspect of the present invention, there is provided a method of minimizing a voltage drop in driving voltages outputted by a plurality of drive integrated circuit chips for providing driving signals to a plurality of gate lines or a plurality of data lines of a LCD device. The method comprises cascading the plurality of drive IC chips with a LOG to transmit a plurality of signals provided from an external driving circuit to the plurality of the drive IC chips, wherein the LOG line includes an analog power line and a digital power line; and temporarily shorting the analog and digital power lines.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Hereinafter, a COG type LCD device according to one or more embodiments the present invention will be described with reference to the accompanying drawings.

Figure 1:
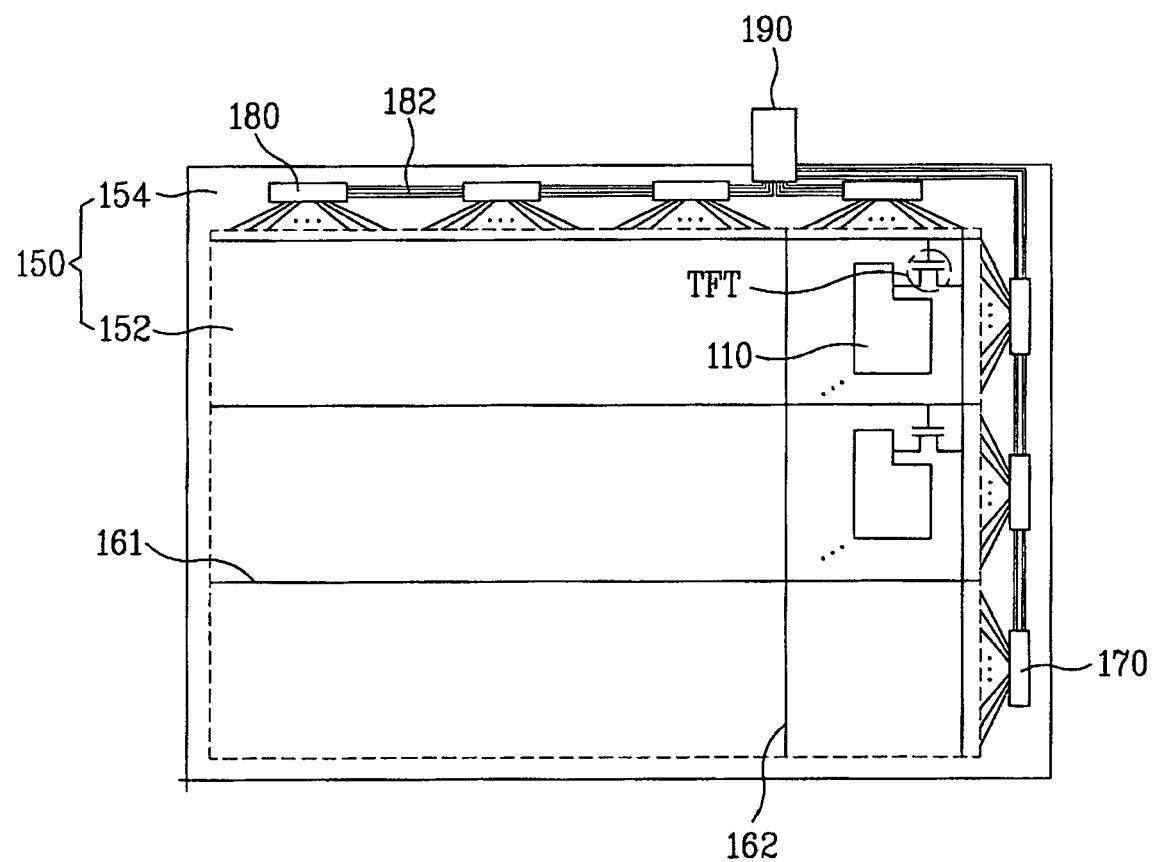
FIG. 1 is a plan view illustrating a COG type LCD device according to a related art.
Figure 2:
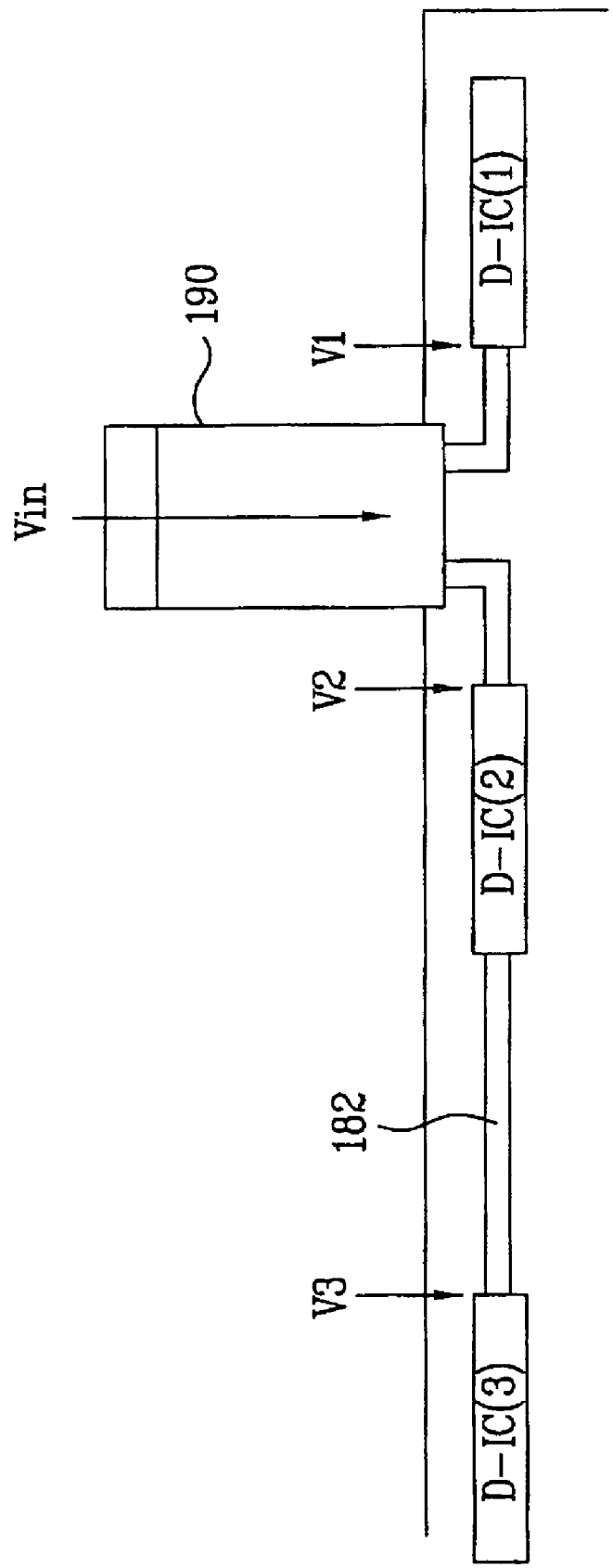
FIG. 2 is a schematic view illustrating an arrangement of data drive IC chips according to the related art.
Figure 3:
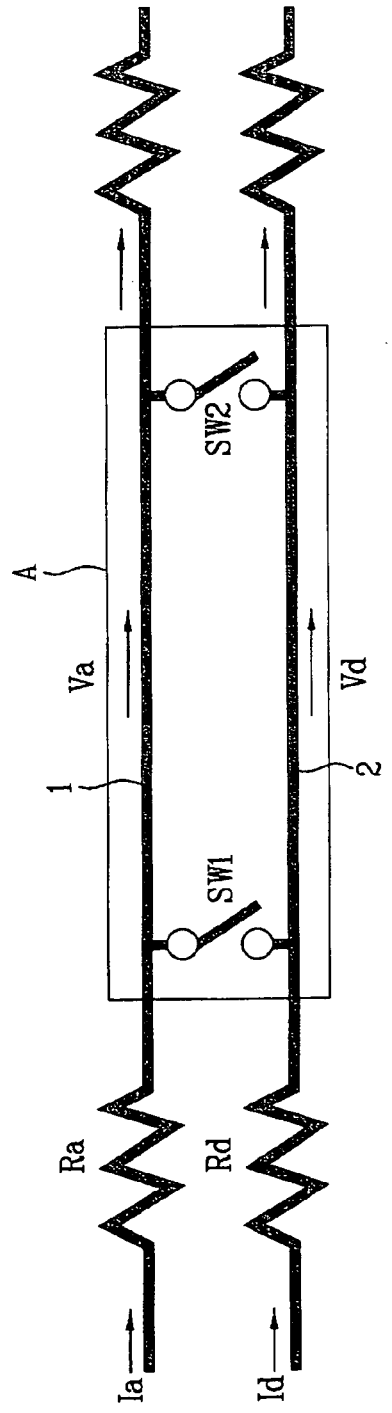
FIGS. 3 and 4 are schematic views for explaining a driving line according to an embodiment of the present invention.
Figure 4:
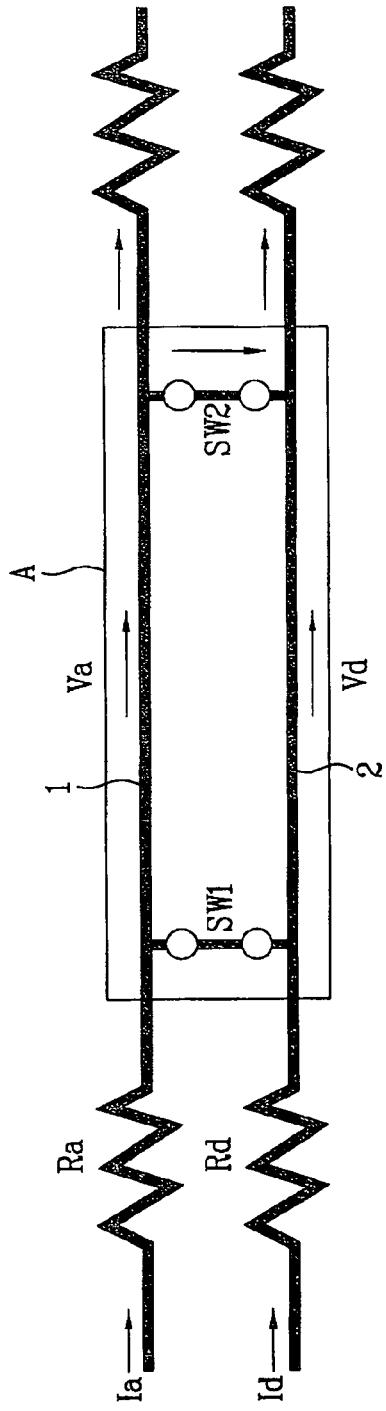

FIGS. 3 and 4 are schematic views for explaining a driving line according to an embodiment of the present invention.

First, a COG type LCD device according to the embodiment of the present invention includes an image display area and a non-image display area.

The image display area includes a plurality of gate and data lines (not shown) crossing each other to define a plurality of pixel regions and a plurality of thin film transistors TFT corresponding to the pixel regions. Each TFT includes a gate electrode, a gate insulating layer, a semiconductor layer, and source and drain electrodes. Each TFT is positioned adjacent to a crossing of the gate and data lines, and each pixel electrode is electrically connected with the corresponding drain electrode of the thin film transistor TFT so as to receive the video signal.

The non-image display area includes a plurality of gate drive IC chips and a plurality of data drive IC chips. The gate drive IC chips are connected with ends of the respective gate lines so as to apply the scanning signal to the gate lines. The data drive IC chips are connected with ends of the respective data lines so as to apply the video signal to the data lines. The plurality of data drive IC chips are cascaded by a LOG line.

The LOG line for connecting the plurality of data drive IC chips may include a plurality of signal lines for providing data driving signals such as the video signal, a driving signal (VCC) and a ground voltage signal (GND) generated from a power supplier, and for providing gate driving signals such as a source enable signal (SOE), a source shift clock signal (SSC) and a source start pulse (SSP) generated from a timing controller. Also, a power line for applying the driving signals is divided into an analog power line and a digital power line. The analog power line can be substantially parallel to the digital power line.

As shown in FIG. 3, first and second switches SW1 and SW2 can be provided between the analog power line 1 and the digital power line 2 to minimize or to prevent the drop of the driving voltage outputted from the cascaded data drive IC chips from occurring. In FIG. 3, 'A' corresponds to an ACF resin formation area on which the data drive IC chips are mounted.

The first and second switches SW1 and SW2 can be provided inside each of the data drive IC chips. The first switch SW1 can be formed adjacent to one end of the data drive IC chip, and the second switch SW2 can be formed adjacent to the other end of the data drive IC chip. The switches can also be spaced apart in regular intervals from each other.

If a high current flows in the analog power line 1, as shown in FIG. 4, the first and second switches SW1 and SW2 can be closed. When one or both switches SW1 and SW2 close, the analog power line 1 and the digital power line 2 are connected to form a parallel resistance structure. Accordingly, the current (Ia) flowing in the analog power line 1 is divided and provided to the digital power line 2. That is, the amount of current flowing in the analog power line is decreased, to thereby minimize the voltage drop caused by the high current flowing through the analog power line 1.

It is desirable to apply this embodiment to situations in which the current flowing in the analog power line is larger than the current flowing in the digital power line. In order to obtain the high flowing current, a power line with low resistance is generally selected. Accordingly, it may be necessary that the digital power line is larger in resistance than the analog power line.

For example, if the resistance (Ra) of the analog power line 1 is 10 Ω, and the resistance (Rd) of the digital power line 2 is 50 Ω, the parallel resistance is 8.3 Ω when one or both of the first and second switches are closed. That is, when the first and second switches SW1 and SW2 are open, the resistance of the analog power line is 10 Ω. When the first and second switches SW1 and SW2 are closed, the effective resistance of the analog power line is 8.3 Ω, thereby minimizing the voltage drop in the analog power line. This embodiment of the present invention is especially advantageous when the size of the panel area is limited, that is, in situations in which the resistance is not decreased with the thick analog power line.

The voltage applied to the analog power line 1 is substantially identical to the voltage applied to the digital power line 2. If the voltage of the analog power line 1 is different from the voltage of the digital power line 2, the current Ia of the analog power line 1 doesn't flow directly into the drive IC chip, but flows into the digital power line 2 via the first switch SW1.

The first and second switches SW1 and SW2 can be temporarily closed for the duration in which the current Ia flowing in the analog power line 1 is increasing. Also, the first and second switches SW1 and SW2 can be closed between the points of receiving the source output enable (SOE) signal and receiving the sampling start pulse (SSP) signal.

In detail, the first and second switches SW1 and SW2 may be closed between the point when the output flows into the drive IC chip and the point when the sampling is started in the duration in which the current Ia flowing through the analog power line 1 is increasing. The point that the output flows into the drive IC chip corresponds to the timing when the SOE pulse rises or falls. The switches SW1 and SW2 can be closed between the points of receiving the SOE signal and receiving the SSP signal.

That is, the analog and digital powers are short-circuited before sampling of a digital circuit, whereby the current Ia flowing through the analog power line 1 is divided and provided to the digital power line 2, to thereby minimize the voltage drop occurring on the analog power line 1. Accordingly, it is possible to minimize or to prevent the drop in the driving voltage outputted from the data drive IC chip from occurring when cascading the data drive IC chips.

The above explanation according to the preferred embodiment of the present invention relates to the data drive IC chips. However, the embodiment is also applicable to the cascaded gate drive IC chips.

As mentioned above, the COG type LCD device according to the present invention has the following advantages.

In the COG type LCD device according to the embodiment of the present invention, the digital power line and the analog power line are temporarily shorted during the time when the current through the power line is increased. That is, the analog power line and the digital power line are connected to form the parallel resistance structure, to thereby minimize the drop of the analog driving voltage.

The driving voltage with the minimal drop outputted from the data drive IC chip is applied to each pixel region. Accordingly, there is little to no difference of luminance in the pixel regions. Thus, the deterioration of picture in the pattern (the black color of the normally white mode) having the largest inflow of current is prevented.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A LCD (Liquid Crystal Display) device, comprising:
an image display area including a thin film transistor and a pixel electrode in a pixel region defined by gate and data lines crossing each other;
a plurality of drive IC chips formed on a periphery of the image display area;
a LOG (Line On Glass) line for cascading the plurality of drive IC chips to divide a plurality of signals inputted from an external driving circuit and configured to provide the divided signals to the respective drive IC chips, wherein the LOG line including an analog power line and a digital power line; and
first and second switches provided between the analog and digital power lines and configured to temporarily short the analog and digital power lines,
wherein a voltage applied to the analog power line is substantially identical to a voltage applied to the digital power line, and
wherein the first and second switches are configured to be temporarily closed between points of receiving a SOE (Source Output Enable) signal and a SSP (Sampling Start Pulse) signal.

2. The LCD device of claim 1, wherein the plurality of drive IC chips are a plurality of data drive IC chips.

3. The LCD device of claim 1, wherein the first and second switches are provided in each drive IC chips.

4. The LCD device of claim 3, wherein the first switch is provided adjacent to one end of the drive IC chip, and the second switch is provided adjacent to the other end of the drive IC chip.

5. The LCD device of claim 1, wherein the first and second switches are configured to be temporarily closed when a current flowing through the analog power line is increasing.

6. The LCD device of claim 1, wherein a resistance of the digital power line is larger than a resistance of the analog power line.

7. The LCD device of claim 6, wherein a current flowing through the analog power line is larger than a current flowing through the digital power line.

8. The LCD device of claim 1, wherein the plurality of drive IC chips are a plurality of gate drive IC chips.

9. The LCD device of claim 1, wherein the analog power line is substantially parallel to the digital power line.

10. The LCD device of claim 1, wherein the first and second switches are spaced apart from each other at regular intervals.

11. An apparatus to provide a plurality of driving voltage signals to a plurality of gate lines or a plurality of data lines of a LCD (Liquid Crystal Display) device, comprising, the apparatus comprising:
- a plurality of drive integrated circuit (IC) chips configured to provide driving signals to the plurality of the gate lines or the plurality of the data lines;
- a LOG (Line On Glass) line configured to cascade the plurality of drive IC chips and configured to transmit a plurality of signals provided from an external driving circuit to the plurality of the drive IC chips, wherein the LOG line includes an analog power line and a digital power line; and
- first and second switches configured to temporarily short the analog and digital power lines,
- wherein a voltage applied to the analog power line is substantially identical to a voltage applied to the digital power line, and
- wherein the first and second switches are configured to be temporarily closed between points of receiving a SOE (Source Output Enable) signal and a SSP (Sampling Start Pulse) signal.

12. The apparatus of claim 11, wherein the first and second switches are configured to short the analog and digital power lines when a current flowing through the analog power line is increasing.

13. The apparatus of claim 11, wherein an electrical resistance of the digital power line is larger than an electrical resistance of the analog power line.

14. The apparatus of claim 11,
- wherein the first and second switches comprise a plurality of switches all configured to temporarily short the analog and digital power lines, and
- wherein at least one of the first and second switches is provided in each drive IC chip.

15. The apparatus of claim 14, wherein at least two of the plurality of switches are provided in each drive IC chip.

16. A method of minimizing a voltage drop in driving voltages outputted by a plurality of drive integrated circuit (IC) chips for providing driving signals to a plurality of gate lines or a plurality of data lines of a LCD (Liquid Crystal Display) device, the method comprising:
- cascading the plurality of drive IC chips with a LOG (Line On Glass) to transmit a plurality of signals provided from an external driving circuit to the plurality of the drive IC chips, wherein the LOG line includes an analog power line and a digital power line; and
- temporarily shorting the analog and digital power lines through first and second switches,
- wherein a voltage applied to the analog power line is substantially identical to a voltage applied to the digital power line, and
- wherein the first and second switches are configured to be temporarily closed between points of receiving a SOE (Source Output Enable) signal and a SSP (Sampling Start Pulse) signal.

17. The method of claim 16, wherein the step of temporarily shorting the analog and digital power lines includes:
- determining if a current flowing through the analog power line is increasing; and
- shorting the analog and digital power lines upon determining that the current flowing through the analog power line is increasing.

18. The method of claim 17, wherein the step of shorting the analog and digital power lines include closing one or more switches formed in between the analog and digital power lines.

* * * * *